United States Patent [19]

Landmeier

[11] Patent Number: 4,831,216

[45] Date of Patent: May 16, 1989

[54] DIGITIZER SYSTEM WITH INTERTWINED LOOPBACK CONDUCTOR GRID

[75] Inventor: Waldo L. Landmeier, Phoenix, Ariz.

[73] Assignee: CalComp, Inc., Anaheim, Calif.

[21] Appl. No.: 156,358

[22] Filed: Feb. 12, 1988

[51] Int. Cl.$^4$ ............................................. G08C 21/00
[52] U.S. Cl. ...................................................... 178/19
[58] Field of Search ....................... 178/18, 19; 382/13

[56] References Cited

U.S. PATENT DOCUMENTS

4,707,573 11/1987 Etherington et al. ................ 178/18

Primary Examiner—Stafford D. Schreyer
Attorney, Agent, or Firm—Nutter, McClennen & Fish

[57] ABSTRACT

In a digitizer system, a primary set of conductors is formed by looping spaced conductors in pairs through four quarter sections of a grid active area in such a way that the unexcited or directional polarities of each pair are different in each quarter section. A secondary set of conductors is formed by looping at least one additional conductor back and forth through the active area in the spaces between the conductor pairs of the primary set. A coil in a pen tip is movable relative to the grid, and used to inductively couple signals in the conductors of the grid. This intertwined conductor loopback arrangement permits coverage of relatively large grid active areas with a minimal number of multiplexers for switching the conductors to signal processing circuitry.

30 Claims, 6 Drawing Sheets

DIGITIZER SYSTEM WITH INTERTWINED LOOPBACK CONDUCTOR GRID

BACKGROUND OF THE INVENTION

This invention relates to a method and apparatus for determining the position of a coil relative to a grid of spaced conductors, such as those involved in so-called pen digitizer systems, and more particularly, digitizer systems which achieve high resolution with substantial reductions in components and cost.

Various high resolution digitizer systems, which translate a position of a movable instrument, such as a pointer or pen, into electrical signals for transmission to a local or remote utilization device, are well known in the art.

U.S. Pat. No. 4,210,775 to James L. Rodgers et al discloses a digitizer system in which a pen having a coil disposed within its tip is utilized in conjunction with a support surface having an active area defined by a grid of conductors. The grid includes a group of parallel spaced conductors oriented in an X direction and a group of parallel spaced conductors oriented in a Y direction. An oscillator applies an AC signal of predetermined frequency and amplitude to the coil. The coil signal is inductively coupled to the conductors of the grid, thereby inducing AC electrical signals in the conductors.

In accordance with the well known principles of electromagnetic theory, the magnitude and phase of the signals induced in the grid conductors depend on the location of the conductors relative to the coil. Generally, the signals induced in the conductors will have a zero magnitude at the center of the coil and maximum magnitude at the coil's periphery. Further, the phase of the signals on one side of the coil will be the reverse of (180° displaced from) the phase of the signals on the other side of the coil. The grid conductors in each group are scanned sequentially through the use of multiplexer circuitry to sequentially couple the induced signals to detection circuitry. A position counter is incremented in response to the oscillator as the conductors in each group are sequentially scanned.

The detection circuitry includes a phase sensitive detector and associated circuitry for generating a characteristic signal that changes polarity in response to a reversal in the phase of the induced signals as the conductors are scanned. As noted above, the phase of the induced signals reverses, and thus the polarity of the characteristic signal changes, as one steps from a conductor on one side of the coil to a conductor on the other side of the coil. This polarity change in the characteristic signal can thus be used to locate the coil relative to the conductors. The detection circuitry generates a stop signal that is coincident in time with the polarity change in the characteristic signal. The stop signal is used to disable the position counter which was being incremented during the scanning. Thus, the contents of the position counter when stopped represent the location of the coil with respect to the X group of conductors, and are loaded into an output register. The position counter is then reset, and the conductors of the Y group are scanned in a similar manner to load the output register with a second digital number representing the location of the coil with respect to the Y group of conductors.

U.S. Pat. No. 4,423,286 to Gary A. Bergeron discloses a digitizer system which, like that disclosed in the Rodgers patent, utilizes a coil in a pen to induce signals in an X and Y grid of spaced conductors. In the Bergeron system, however, the conductors of the grid are not scanned sequentially to locate the coil. Instead, addressable multiplexer circuitry in the Bergeron system first couples the center conductor of the X group to detection circuitry which detects the polarity of the signal induced therein. From this polarity and the above-noted principles of electromagnetic theory, a determination is made whether the coil is to the right or to the left of the center conductor. The multiplexer circuitry then couples to the detection circuitry the center conductor of the half section (right or left) in which the coil is known to be located. Again, from the polarity of the signal induced in that conductor, a determination is made as to the particular quarter section in which the coil is located. Additional samplings are taken in the same fashion until it is ascertained that the coil lies between two adjacent X group conductors.

The precise position of the coil between the two adjacent X group conductors is then determined by examining the respective magnitudes of the signals induced in the adjacent conductors. Specifically, a ratio of these signal magnitudes is formed which identifies the precise X location of the coil between the two conductors.

A like set of samplings and measurements is performed on the conductors of the Y group to obtain a precise Y location.

Typically, the active areas of digitizer systems of the above-described types include at least 64 separate conductors in the X group and 64 separate conductors in the Y group. Conventional multiplexers have either eight or 16 switchable inputs. Thus, at least four multiplexers (or eight, depending upon multiplexer type used) are required for coupling the conductors of the X group to the detection circuitry, and an additional four (or eight) multiplexers are required for coupling the conductors of the Y group to the detection circuitry. The need for plural multiplexers for each conductor group in the digitizer grid adds considerably to the cost and complexity of design of such systems.

In my copending patent application, Ser. No. 026,217 entitled "Digitizer System With Loopback Conductor Grid", filed Mar. 16, 1987, now U.S. 4,734,546, and assigned to the same assignee hereof, a digitizer system of improved design is disclosed. That system utilizes a conductor loopback arrangement which substantially reduces the number of conductors required to span a given active area, and substantially reduces the number of multiplexers required to handle such conductors.

In accordance with the invention disclosed in that application, the grid active area is divided into a plurality of sections, and conductors are looped back and forth across the active area so that each conductor has a segment passing through each of the sections. One end of each conductor is grounded so that each crossing conductor segment has an "unexcited" or "directional" polarity defined in reference to its grounded end. The conductors are passed through the sections in a predetermined order so that the combination of the directional polarities of adjacent conductor segments is different in each section. Due to these known, but different directional polarities, each section of the grid active area is uniquely identifiable even though handled by the same conductors. Consequently, the number of separate conductors in each conductor group required to span the active area is reduced. Also, the number of multiplexers required to couple such conductors to induced signal detection circuitry is reduced. Thus, for example, by looping the conductors in pairs through four equally sized quarter sections of the grid active area, 16 conductors in each group can be used to span the same active area that formerly required 64 conductors, and one 16-input multiplexer can be used for each group that formerly required four such multiplexers. This reduction in conductors and components substantially reduces the cost of the digitizer system, while maintaining the high resolution and accuracy of existing systems.

The conductor loopback digitizer of my copending application preferably operates similarly to that disclosed in the above-referenced Bergeron patent, by first coarsely locating an inducing coil as being somewhere between two adjacent conductor segments by sampling the phase of the signals induced therein, and then precisely locating the coil between the two adjacent conductor segments by forming a ratio of the respective magnitudes of such signals. The result is a relatively simple, low cost digitizer system capable of very high resolution position determination.

In a typical conductor loopback digitizer, adjacent conductor segments are spaced from one another by about 0.4 inch or less. Thus, it is possible to span an active area in either the X or Y direction extending about 25.2 inches (63 spaces times 0.4 inch) using 16 conductors and one 16-input multiplexer. Often, digitizer systems require active areas larger than this. In such large area systems, either the spacing between adjacent conductor segments must be increased, or additional conductors and additional multiplexers must be used. In the former case, accuracy is sacrificed, while in the latter case, costs associated with components and manufacturing increase.

SUMMARY OF THE INVENTION

The present invention is aimed at extending the conductor loopback arrangement of my copending application to accommodate large grid active areas without sacrificing accuracy or significantly increasing component or manufacturing costs.

In accordance with the present invention, a conductor loopback arrangement of the type described in my copending application is used to form a primary set of conductors in a digitizer system. The spacing between adjacent conductor segments in the primary set is selected to span the desired grid active area dimension. This spacing may be selected to be greater than that which is typically used to provide accurate coil location between segments using an induced signal magnitude ratio approach. A secondary conductor set is formed from one or more additional conductors which are intertwined in a loopback fashion back and forth in the spacings between the adjacent conductor segments of the primary set. The secondary conductors subdivide the spacing between adjacent conductor segments in the primary set so as to permit accurate coil position determination between the segments using an induced signal magnitude ratio approach.

With this intertwined conductor loopback arrangement, an inducing coil may first be coarsely located as being somewhere between adjacent conductor segments of the primary set by sampling the phase of the signals induced in the conductors of the primary set. The coil is then more precisely located as being somewhere between immediately adjacent conductor segments (whether from the primary set or secondary set) by sampling the phases of the signals induced in the conductors of the secondary set together with the phases of the signals induced in the two conductors of the primary set which are known to encompass the coil. Finally, the coil is precisely located between those two conductor segments for forming a ratio of the magnitudes of the signals induced therein.

In the illustrative embodiment of the invention described hereinbelow, the primary set comprises 14 conductors (seven pairs) which are looped through four equally sized quarter sections of a grid active area in the fashion described in my copending application and coupled respectively to 14 of the 16 inputs of a 16-input multiplexer. Adjacent conductor segments in the primary set are spaced from one another by 1.2 inches, yielding a grid active area dimension of 67.2 inches (56 spaces times 1.2 inches). The secondary set comprises two conductors which are intertwined between adjacent conductor segments of the primary set so as to be equally spaced therefrom and from each other by 0.4 inch. The secondary conductors are coupled respectively to the remaining two inputs of the 16-input multiplexer. With this arrangement, a grid active area extending 67.2 inches in each dimension is achievable using only 16 total conductors and only one 16-input multiplexer for each dimension, while still maintaining a maximum conductor segment spacing of 0.4 inch.

BRIEF DESCRIPTION OF THE DRAWING

The foregoing and other features and advantages of the invention will be better understood from the following detailed description taken with the accompanying drawing in which.

DETAILED DESCRIPTION OF PREFERRED EMBODIMENT

Figure 1:
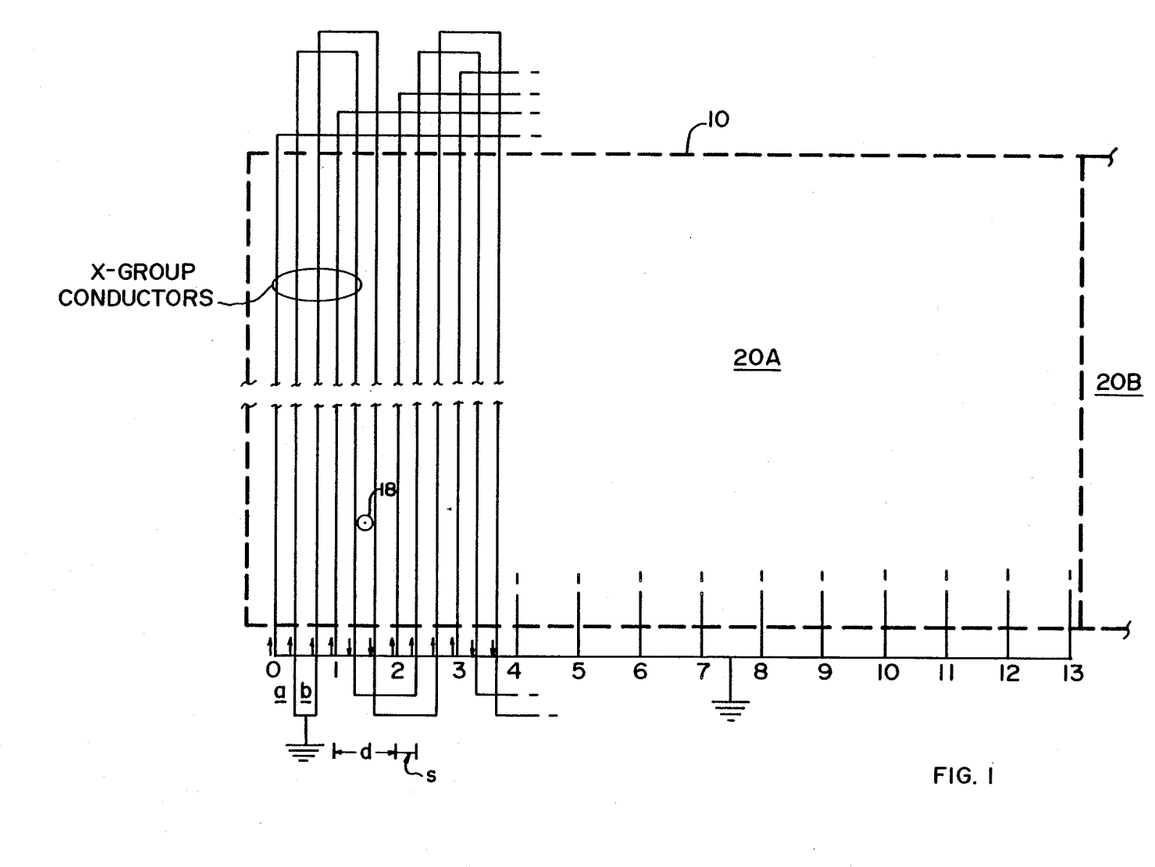
FIG. 1 is an illustration of a digitizer system conductor grid embodied in accordance with the invention, showing a primary set of conductors looped in seven pairs through four quarter sections of a grid active area, and a secondary set of two conductors intertwined between adjacent conductor segments of the primary set.

Referring now specifically to the drawing, and initially to FIG. 1 thereof, there is shown an intertwined loopback digitizer conductor grid embodied in accordance with this invention. The grid, which defines a digitizer active area 10, is comprised of a first group of conductors having a number n of parallel, equally spaced conductor segments oriented in an X direction (vertically in FIG. 1), and a second group of conductors having a number m of parallel, equally spaced conductor segments oriented in a Y direction (horizontally in FIG. 1). The total number n of conductors in the X group may or may not be selected to be equal to the total number m of conductors in the Y group, depending upon whether a square, rectangular or other shape is desired for the grid active area 10. A coil 18, illustratively disposed in the tip of a pen or pointer (not shown), is movable relative to the grid. The function of the digitizer system is to identify the position of the coil 18 on the grid precisely. This is accomplished in the preferred embodiment described herein by applying an AC signal to the coil 18 and by analyzing the electrical signals inductively coupled to the conductors of the grid by the coil 18.

In the preferred embodiment, the X group conductors are configured identically to the Y group conductors, except for the fact that the Y group conductors are oriented at 90 degrees to the X group conductors to form the grid. Because of this, only the X group conductor configuration will be described in detail.

The X group conductors include a primary set and a secondary set of conductors. The primary set of conductors consists of 14 conductors labelled 0 through 13 in FIG. 1 (seven pairs) which are looped through four quarter sections 20A through 20D of the grid active area 10 in the manner described in my copending application Ser. No. 026,217 so that the combination of the unexcited or directional polarities of each pair of adjacent conductor segments in the primary set is different in each of the quarter sections. As shown in FIG. 1, one end of each of the 14 conductors in the primary set is connected to ground, while the other ends of each of the 14 conductors in the primary set are connected to inputs 0 through 13, respectively, of an X-multiplexer 22. As noted earlier, the directional polarity of each conductor segment in each section is defined with reference to its grounded end. The arrow just to the left and near the lower end of each conductor segment in FIG. 1 indicates its directional polarity.

Thus, for example, if we assume a positive directional polarity for that segment of a conductor passing through a quarter section which has its lower end, as seen in FIG. 1, grounded (which has an upwardly directed arrow in FIG. 1), then in section 20A, the segments of conductors 0 and 1 of the primary set are both positive. Although not shown in FIG. 1, in section 20B, the segment of conductor 0 of the primary set is negative while the segment of conductor 1 of the primary set is positive, and in section 20C, the segment of conductor 0 is positive, while the segment of conductor 1 is negative. Finally, as indicated to the right in FIG. 1, in section 20D, the segments of conductors 0 and 1 are both negative. Due to this unique combination of directional polarities in each quarter section, each segment of each conductor of the primary set in effect appears as if it were a separate and distinct "wire" to signal processing circuitry used to analyze the signals induced in the conductors.

For a more detailed description of this conductor loopback arrangement, reference should be made to my copending application Ser. No. 026,217, the disclosure of which is incorporated herein by reference.

The secondary set of conductors in the X group is comprised of two conductors, labelled a and b in FIG. 1, which are looped back and forth in the spacing between adjacent conductor segments of the primary set. The secondary conductors a and b are spaced equally from one another and equally from the nearest conductor segments of the primary set. As shown in FIG. 1, one end of each of the secondary conductors a and b is connected to ground, while their other ends are connected to inputs 14 and 15, respectively, of the X-multiplexer 22. As a result of this connection, the secondary conductors a and b also have directional polarities indicated by the arrows to the left and near the lower end of each segment shown in FIG. 1.

The X-multiplexer 22 is capable of switching any selected one of the conductors of the primary set (inputs 0 through 13) and of the secondary set (inputs 14 and 15) to induced signal processing circuitry to be described in detail below.

Illustratively, the spacing "d" between each adjacent conductor segment in the primary set is 1.2 inches and constant across the entire active area 10. The segments of the secondary conductors a and b are spaced from one another and from the nearest conductor segment in the primary set by a distance "s" equal to 0.4 inch. Each quarter section 20A through 20D thus has a width equal to 16.8 inches (14 spaces times 1.2 inches). The effective range of the inducing coil 18 used to excite the conductors is selected to be approximately equal to the width of each quarter section 20A through 20D (i.e., 16.8 inches). Thus, each conductor segment can be handled as a separate and distinct "wire" during induced signal detection and processing simply by adjusting (i.e., changing, where appropriate) the polarities of the detected signals to account for the directional polarity differences in each quarter section. This polarity adjustment scheme is described in my copending application and in more detail below in connection with FIGS. 3 and 4.

With the above-described intertwined conductor loopback arrangement, one can span an active area width of 67.2 inches (56 spaces times 1.2 inches) with 16 conductors (14 in the primary set and two in the secondary set) using only one 16-input multiplexer to switch such conductors to induced signal detection circuitry. This represents more than twice the active area spread achievable with the basic conductor loopback arrangement disclosed in my copending application. Additionally, since the intersegment spacing "s" remains at 0.4 inch, this larger area capability is achieved without sacrificing accuracy.

Figure 2:
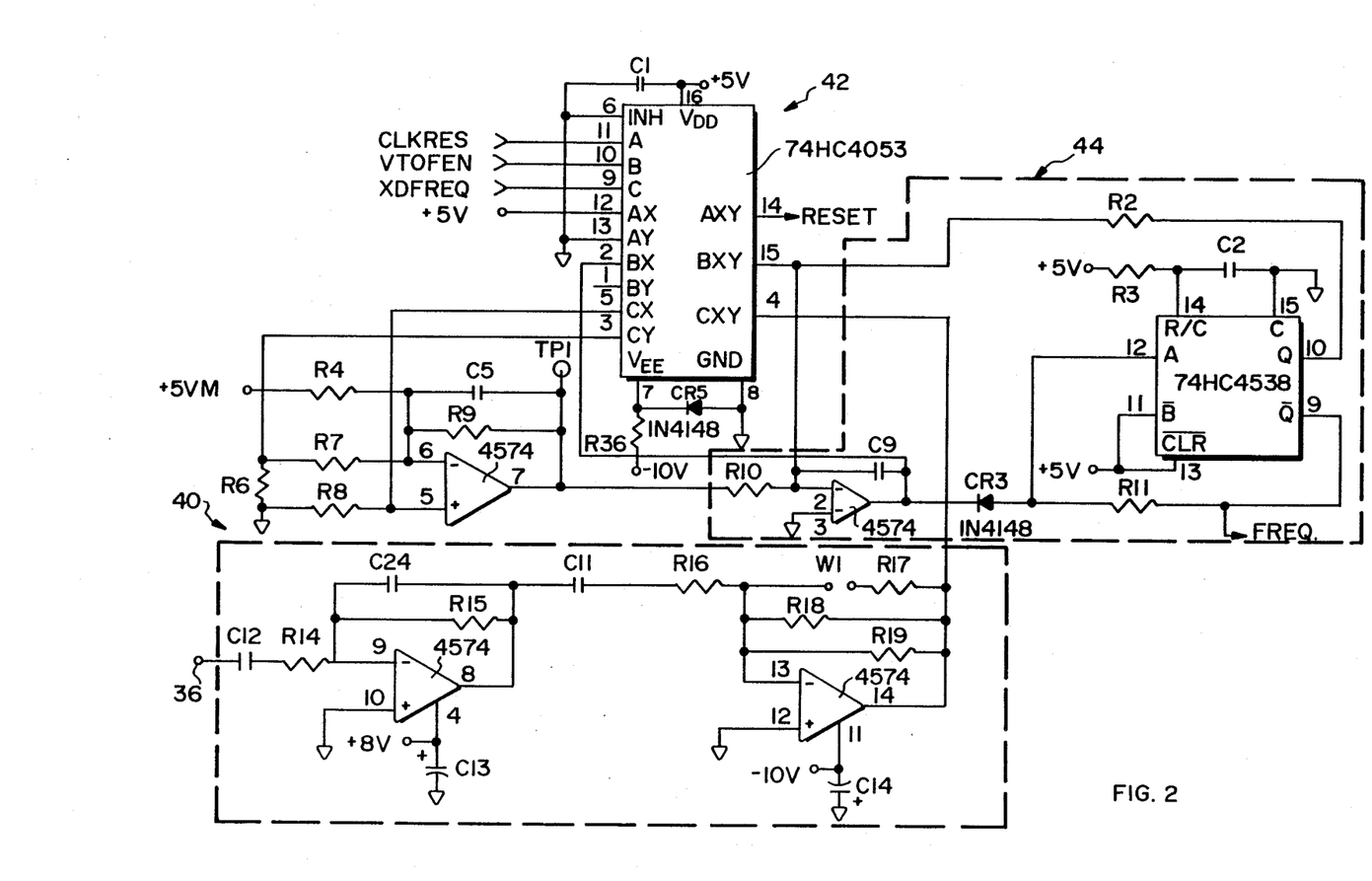
FIG. 2 illustrates circuitry for detecting electrical signals induced in the conductors of the grid of FIG. 1 and for digitizing such signals for further processing.

FIG. 2 illustrates circuitry for detecting the AC electrical signals induced in the conductors of the grid active area 10 by the coil 18. As shown in FIG. 1, the X-multiplexer 22 and a corresponding Y-multiplexer 24 for the Y group conductors have outputs 32 and 34, respectively. These outputs 32 and 34 are connected to input 36 of the detection circuitry of FIG. 2. As noted earlier, the multiplexer 22, when enabled, selects one of its 16 inputs 0 through 15 for coupling to its output 32, and thence to the input 36 of the circuitry of FIG. 2. Similarly, the multiplexer 24, when enabled, selects one of its 16 inputs 0 through 15 for coupling to its output 34, and thence to the input 36 of the circuitry of FIG. 2. Thus, each conductor in the X group and Y group of the grid can be separately coupled to the detection circuitry of FIG. 2 so that the AC signal induced therein by the coil 18 can be analyzed.

The AC signal coupled to input 36 is first passed through an amplifier and filter circuit 40 which provides the proper operating signal levels for the system and filters out noise and other unwanted signal components. The output of the amplifier and filter circuit 40 is applied to a synchronous demodulator 42 which converts the input AC signal to a C signal. As discussed more fully below the demodulator 42 is synchronized with the AC signal used to excite or drive the coil 18. The DC signal that is outputted by the synchronous demodulator 42 has a voltage that is proportional to the amplitude of the AC signal that is applied to the input 36, and a polarity that corresponds to that signal's phase.

The output of the synchronous demodulator 42 is based to yield a unipolar voltage and then applied to an analog-to-digital converter such as the voltage-to-frequency converter 44 shown in the example of FIG. 2. The converter 44 converts the DC voltage output from the demodulator 42 to a variable frequency signal FREQ. The frequency of the signal FREQ deviates from a predetermined value in proportion to the DC voltage at the output of the synchronous demodulator 42, with the magnitude of the deviation being proportional to the voltage, and the direction of the deviation corresponding to its polarity. The signal FREQ is coupled to the circuitry shown in FIG. 3 for further processing.

Figure 3:
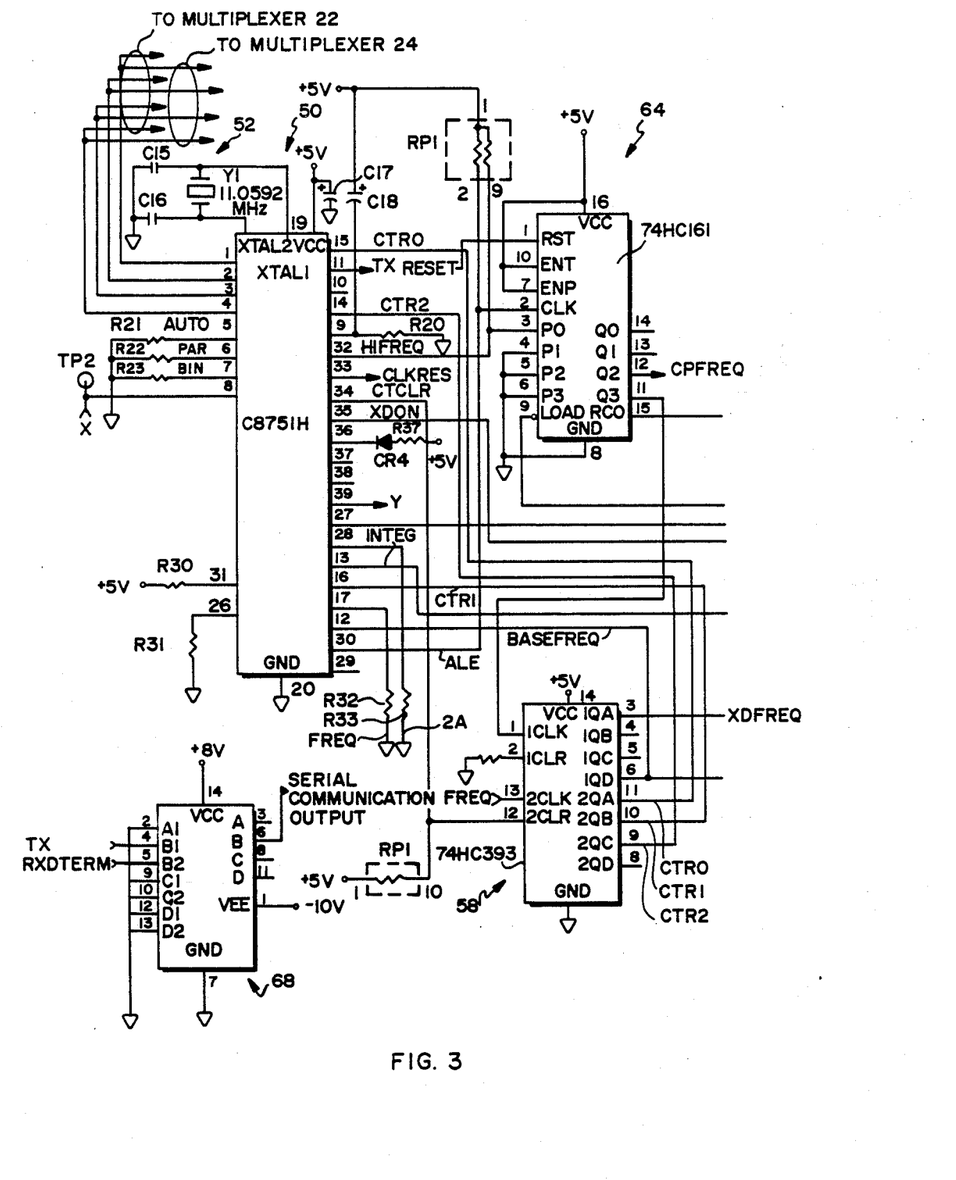
FIG. 3 illustrates circuitry including microprocessor means for processing the digitized signals developed by the circuitry of FIG. 2 and for controlling multiplexer means shown in FIG. 1 during the sampling the conductors of the digitizer system grid.

In the circuitry of FIG. 3, a microprocessor 50 is suitably connected to, and programmed to control the sampling of the conductors of the grid. The outputs of the microprocessor 50 at pins 1 through 4 are address signals which are coupled to address inputs (not shown) to the X-multiplexer 22 and Y-multiplexer 24 of FIG. 1. The microprocessor 50 also has outputs at pins 8 and 39 which are respectively coupled to an X-enable input (not shown) of multiplexer 22 and Y-enable input (not shown) of multiplexer 24. When the microprocessor 50 emits an X-enable signal, it enables multiplexer 22, and disables multiplexer 24. Similarly, when the microprocessor 50 emits a Y-enable signal, it enables multiplexer 24, and disables multiplexer 22. The address signals specify the selected one of the multiplexer inputs 0 through 15, and thus the selected one of the conductors, that is coupled to the input 36 of the detection circuitry of FIG. 2.

An oscillator 52 controls the timing of the microprocessor 50, enabling it to generate various timing signals to control the other components in the circuitry of FIG. 3. For example, the output of the microprocessor 50 at pin 30 is divided down in frequency by counter 64 and then counter 58 to generate the AC signal XDFREQ which is used to drive the coil 18 and as the phase reference signal for the synchronous demodulator 42.

The signal FREQ from the voltage-to-frequency converter 44 of FIG. 2 is inputted to the counter 58 of FIG. 3. The counter 58 operates in conjunction with a counter internal to microprocessor 50 at pin 14 to generate digital numbers indicative of the phase and magnitude of the induced signals detected by the detection circuitry of FIG. 2. The microprocessor 50 utilizes these digital numbers in the sampling of the conductors of the grid to locate the coil 18 relative to the grid. As explained in more detail below, the microprocessor 50 changes the polarities represented by the digital numbers, where appropriate, to account for the different directional polarities of the conductor segments of the primary set in each of the quarter sections 20A through 20D and for the different directional polarities of the conductors segments of the secondary set in the spacings between the primary set segments. Through successive samplings of the digital numbers obtained for the primary set conductors, the microprocessor 50 coarsely locates the coil 18 as being somewhere between two particular adjacent primary set conductor segments. Once this coarse location determination is made, the microprocessor 50 samples the digital numbers for the secondary set conductors and for the two primary set conductors known to encompass the coil 18. This locates the coil 18 as being somewhere between two immediately adjacent conductor segments (whether they be from the primary or secondary set). Finally, the microprocessor 50 generates a ratio of the magnitudes of the signals induced in the two particular conductor segments encompassing the coil 18. This ratio is used by the microprocessor 50 to interpolate the distance between the two segments, and thereby to precisely locate the position of the coil 18 therebetween.

The serial output of the microprocessor 50 at pin 11 is indicative of coil position, and is coupled to a transmitter circuit 68 to enable transmission of such data to auxiliary equipment such as a computer, video display, or the like.

Other details of the circuitry will be evident to those skilled in the art from the integrated circuit designations, signal labels and connections and other specific information provided by way of illustration in FIGS. 2 and 3.

Figure 4:
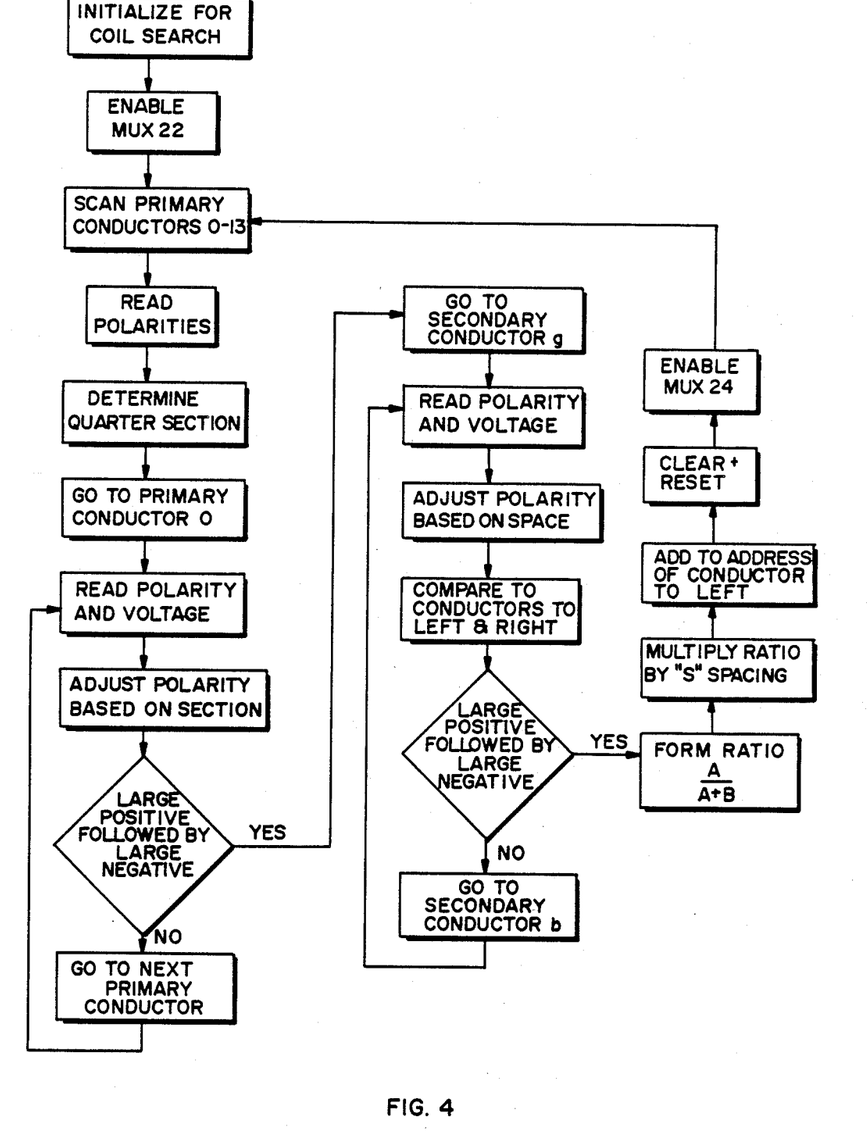
FIG. 4 is a generalized flow chart illustrating the operation of the microprocessor means of FIG. 3.

FIG. 4 is generalized flow chart illustrating the operation of the microprocessor 50. The microprocessor 50, and the circuit components which it controls, are first initialized in preparation for the search for the coil 18. This is followed by the enablement of X-multiplexer 22 and by a scan sequence which involves a sequential scanning of the conductors 0 through 13 of the primary set in the X group and a reading of the polarities of the signals detected on each. These polarities are used to determine the particular quarter section 20A through 20D in which the coil 18 is located.

The particular quarter section can be determined because of the unique combination of directional polarities of each conductor pair in each such section. Assume, for example, that the coil 18 is located between the segments of conductors 1 and 2 of the primary set in quarter section 20A, as shown in FIG. 1. As noted earlier, an upwardly directed arrow in FIG. 1 is assumed to represent a positive directional polarity, while a downwardly directed arrow in FIG. 1 is assumed to represent a negative directional polarity. When conductors 0 through 3 of the primary set are scanned, the polarities obtained will be +, +, −, −. This combination is obtained because the coil 18 has the effect of maintaining "all is" the directional polarities to its left, while reversing the directional polarities to its right. This combination uniquely identifies the quarter section that contains the coil 18 as section 20A. If the coil 18 were located between the segments of conductors 1 and 2 of the primary set in section 20B, the polarity combination obtained during the scan would be −, +,+, −; in section 20C, the combination would be +, −, −, +; and in section 20D, it would be −, −, +, +. Since these combinations are all unique, the particular quarter section containing the coil 18 can be identified.

After determining the quarter section in which the coil 18 is located, the microprocessor 50 goes back to conductor 0 of the primary set and reads the polarity and voltage of the induced signal therefrom. The polarity of the signal is then changed, where appropriate, to account for the particular combination of directional polarities of the conductor pair in the quarter section determined to contain the coil 18 so that, regardless of the quarter section involved, the microprocessor 50 need only search for a transition from a large positive voltage to a large negative voltage. In this example, the polarity changes that are made under the control of the microprocessor 50 are as follows:

for quarter section 20A, no changes to the polarities are made;
for quarter section 20B, the polarities are reversed for the even numbered conductors and kept the same for the odd numbered conductors;
for quarter section 20C, the polarities are reversed for the odd numbered conductors and kept the same for the even numbered conductors;
for quarter section 20D, the polarities are all reversed.

Thus, since the coil 18 has been determined to be in quarter section 20A, the microprocessor 50 make no changes to polarities of induced signals that it reads from the primary set conductors.

The microprocessor 50 next determines whether it has located a large magnitude positive signal on one primary conductor followed by a large magnitude negative signal on another primary conductor adjacent to it. If it has not, it goes to the next conductor and repeats the read and adjust steps. These steps are repeated over and over again until the microprocessor 50 has located the desired transition from large positive to large negative, and has thus coarsely located the coil 18 between the two adjacent primary conductors in quadrant 20A. In the example shown in FIG. 1, the microprocessor 50 will locate the desired large positive-to-large negative transition after scanning and sampling the induced signals on primary conductors 1 and 2.

The microprocessor 50 next goes to the secondary set conductor a and reads the polarity and voltage of its induced signal. The polarity of this signal is again changed, where appropriate, to account for the fact that the directional polarities of the secondary conductors a and b are either both positive or both negative depending upon the primary conductor segment space in which they are located. This again enables the microprocessor 50 to search for a transition from a large positive voltage to a large negative voltage in locating the coil 18 between immediately adjacent conductor segments (whether they be primary or secondary). In this respect, the microprocessor 50 will keep the polarity of the secondary conductor signal the same if the nearest conductor to the left of the coil 18 is even-numbered. It will reverse the polarity of the secondary conductor signal if the nearest primary conductor to the left of the coil 18 is odd-numbered. In the example shown in FIG. 1, primary conductor 1 is to the left of the coil 18. Thus, the microprocessor 50 will reverse the polarity of the signal from secondary conductor a.

The microprocessor 50 next determines whether it has located a large magnitude positive signal on one conductor segment followed by a large magnitude negative signal on an immediately adjacent conductor segment. If it has not, it goes to secondary conductor b and repeats the read and adjust steps until it locates the coil 18 between two immediately adjacent conductor segments (in this example, between secondary conductors a and b.)

As noted earlier, the preferred embodiment is adapted to precisely locate the coil 18 between the two immediately adjacent conductor segments using a ratio technique. In this respect, the microprocessor 50 forms a ratio r according to the following equation:

$$r = A/(A+B)$$

where A is the magnitude or absolute value of the signal on the conductor segment to the immediate left of the coil 18, and B is the magnitude or absolute value of the signal on the conductor segment to the immediate right of the coil 18. Absolute values are used because the polarity of the signal on the left conductor segment is positive while the polarity of the signal on the right conductor segment is negative. The microprocessor 50 multiples that ratio by the spacing "s" between the two segments. The result is added to the location of the left segment to obtain a precise coil position within the X group, and this precise X position is saved.

After clearing and resetting the circuit components which were operated to effect the determination of the coil 18 relative to the X group, the microprocessor 50 disables the X-multiplexer 22, enables the Y-multiplexer 24 and repeats the above described search routine to obtain a precise coil position within the Y group.

It will be appreciated that, with integrated circuit components of the type illustrated in FIGS. 2 and 3, all of the above described operations can be carried out at very high speeds, so that the coil 18 is precisely located relative to the grid active area 10 within fractions of a second. Specific microprocessor program implementations of the generalized flow chart of FIG. 4 will be readily apparent to those skilled in the art.

It should be understood that the above-described embodiment is intended to illustrate rather than limit the invention. Various modifications to the specifically disclosed circuitry and generalized flow chart will suggest themselves to those skilled in the art.

For example, while the secondary set of conductors in the preferred embodiment described herein consisted of two conductors, it could include one, three, or any other number of conductors. Also, while the primary set of conductors in the preferred embodiment involved the looping of conductor pairs through four quarter sections of the grid active area, it could involve the looping of three, four or any other number of adjacent conductors through varying numbers of different sections of the grid active area in such a way that the combination of the directional polarities of each set is different in each such section.

Also, if sufficient memory is available in the microprocessor, the voltage of all the conductors could be acquired and stored in memory. Then, rather than reacquiring the voltages in the sequence in which the conductors appear on the grid, the stored values could be sequentially reviewed thereby souring acquisition time.

Moreover, a sequential scanning technique, rather than a ratioing technique, can be used in determining both coarse and fine positions of the coil 18. With such a sequential scanning technique, a characteristic phase-detected signal of the type shown in FIG. 2C of the above-referenced U.S. Pat. No. 4,210,775 to Rodgers et al is generated utilizing circuitry of the type shown in FIG. 3A of that patent. In this respect, an isolation diode matrix of the type shown in FIG. 4 of the Rodgers et al patent may be employed with the intertwined loopback conductor grid of this invention, rather than grounding one end of each conductor as shown in FIG. 1 of the drawing herein.

Finally, it will be appreciated that, while the preferred embodiment involved driving or exciting the coil 18 to induce signals in the conductors of the grid, that embodiment can be modified to one in which the drive signal is selectively switched by the multiplexers 22 and 24 to respective conductors of the grid to induce signals in the coil 18 which are then detected and processed by the circuitry of FIGS. 2 and 3.

It is accordingly the intent of the appended claims to cover these and other modifications that come within the true and reasonable scope of the invention.

I claim:

1. Apparatus for determining the position of a coil with respect to an active area, comprising:
   (a) a grid of conductors defining said active area, said grid including a first group of n parallel, spaced conductors oriented in an X direction and a second group of m parallel, spaced conductors oriented in a Y direction, each of said groups including a primary set of conductors and a secondary set of conductors, each of said conductors in said set having a predetermined directional polarity;
   (b) said primary sets including at least two spaced conductors that are looped through a plurality of different sections of said active area such that the directional polarities of said spaced conductors are different in each of said sections;
   (c) said secondary sets including at least one additional conductor looped between said spaced conductors of said primary set;
   (d) means for exciting either
      i. said coil to induce electrical signals in said conductors, or
      ii. selected ones of said conductors to induce electrical signals in said coil, said induced signals having a magnitude and polarity depending upon the position of said coil relative to said conductors;
   (e) means for detecting the induced signals; and
   (f) switching means for selectively switching said conductors to either
      i. said detecting means; or
      ii. said exciting means.

2. The apparatus of claim 1 wherein said exciting means comprises means for exciting said coil to induce said signals in said conductors, and wherein said switching means comprises means for selectively switching said conductors to said detecting means.

3. The apparatus of claim 2 further including means for sampling the signals induced in said conductors of said primary set so as to coarsely locate said coil as being between two particular conductors of said primary set.

4. The apparatus of claim 3 further including means for sampling the signals induced in said conductors of said secondary set so as to more finely locate said coil between two particular adjacent conductors of said sets.

5. The apparatus of claim 4 further including means for generating a ratio of the magnitudes of the signals induced in said two particular adjacent conductors of said sets so as to precisely identify the position of said coil between said two particular adjacent conductors of said sets.

6. The apparatus of claim 5 wherein said sampling means and said ratio generating means comprise microprocessor means.

7. The apparatus of claim 2 wherein one end of each of said conductors in each of said sets is connected to ground, and wherein said switching means comprises multiplexer means for selectively switching the other ends of said conductors to said detecting means.

8. The apparatus of claim 1 wherein said sections are of equal width and wherein said exciting means has an effective range approximately equal to the width of said sections.

9. The apparatus of claim 1 wherein each pair of spaced conductors in said primary sets is looped through four different quarter sections of said active area such that the combination of the directional polarities of said conductors in said pair is different in each of said sections.

10. The apparatus of claim 9 wherein the directional polarities of said pair of spaced conductors in said primary sets are positive-positive, negative-positive, positive-negative and negative-negative in a first, second, third and fourth of said quarter sections, respectively, as measured along the X direction and along the Y direction.

11. The apparatus of claim 1 further including means for selectively changing the polarities of the detected signals in accordance with the directional polarities of said conductors from which they are detected.

12. The apparatus of claim 11 wherein said polarity changing means comprises microprocessor means.

13. The apparatus of claim 1 wherein said switching means comprises multiplexer means for each said conductor group, said multiplexer means having a plurality of inputs and an output, and wherein said primary set of conductors are connected to a predetermined number of said multiplexer inputs and said secondary set of conductors are connected to the remainder of said multiplexer inputs.

14. A method for determining the position of a coil with respect to an active area defined by a grid of conductors, the grid including a first group of n parallel, spaced conductors oriented in an X direction, and a second group of m parallel spaced conductors oriented in a Y direction, each of said groups including a primary set of conductors and a secondary set of conductors, each of the conductors having a predetermined directional polarity, said method comparising the steps of:
   (a) forming said primary sets by looping at least two spaced conductors through a plurality of different sections of the active area such that the directional polarities of the spaced conductors are different in each of the sections;
   (b) forming said secondary sets by looping at least one additional conductor through said active area between said spaced conductors of said primary sets;
   (c) exciting either
      i. the coil to induce electrical signals in the conductors, or
      ii. selected ones of the conductors to induce electrical signals in the coil, the induced signals having a magnitude and polarity depending upon the position of the coil relative to the conductors; and
   (d) selectively switching the conductors to either
      i. means for detecting the induced signals; or
      ii. means for exciting the conductors.

15. The method of claim 14 wherein said exciting step comprises the step of exciting the coil to induce the signals in the conductors, and wherein said switching step comprises the step of selectively switching the conductors to the induced signal detecting means.

16. The method of claim 15 further including the step of sampling the signals induced in the conductors of said primary sets so as to coarsely locate the coil as being between two particular conductors of said primary set.

17. The method of claim 16 further including means for sampling the signals induced in said conductors of said secondary set so as to more finely locate said coil between two particular adjacent conductors of said sets.

18. The method of claim 17 further including the step of generating a ratio of the magnitudes of the signals induced in the two particular adjacent conductors of said sets so as to precisely identify the position of the coil between the two particular adjacent conductors of said sets.

19. The method of claim 15 wherein one end of each of the conductors in each of said sets is connected to ground, and wherein said switching step comprises the step of selectively switching the other ends of the conductors to the induced signal detecting means.

20. The method of claim 14 wherein said primary set forming step includes the step of looping pairs of spaced conductors through four different quarter sections of the active area such that the combination of the directional polarities of the conductors in each said pair is different in each of the sections.

21. The method of claim 20 wherein the directional polarities of the conductors in each said pair are positive-positive, negative-positive, positive-negative, and negative-negative in a first, second, third and fourth of the quarter sections, respectively, as measured along the X direction and along the Y direction.

22. The method of claim 14 wherein said switching step comprises the steps of connecting said primary set conductors to a predetermined number of inputs of a multiplexer means, connecting said secondary set conductors to the remainder of the inputs of the multiplexer means, and controlling the multiplexer means to select one of its inputs.

23. Apparatus for determining the position of a coil with respect to an active area, comprising:
  (a) a grid of conductors defining said active area, said grid including a first group of parallel, spaced conductors oriented in an X direction and a second group of parallel, spaced conductors oriented in a Y direction, each of said groups including a primary set of conductors and a secondary set of conductors, one end of each of said conductors in each of said groups being connected to ground, each of said conductors having a predetermined directional polarity defined with reference to said grounded end;
  (b) said primary sets including a plurality of pairs of adjacent conductors that are looped through four different quarter sections of said active area such that the directional polarities of each said conductor pair are different in each one of said quarter sections;
  (c) said secondary sets including at least one additional conductor looped back and forth between said conductor pairs of said primary sets;
  (d) a coil movable relative to said grid;
  (e) means for exciting either
    i. said coil to induce electrical signals in said conductors, or
    ii. selected ones of said conductors to induce electrical signals in said coil, the induced signals having a magnitude and polarity depending upon the position of said coil in respect to said conductors;
  (f) means for detecting the magnitude and polarity of the induced signals;
  (g) multiplexer means for selectively switching the other ends of said conductors to either
    i. said detecting means; or
    ii. said exciting means; and
  (h) microprocessor means for controlling said detecting means and said multiplexer means and further including means for selectively changing the polarities of said detected induced signals to account for the different directional polarities of said conductor pairs in each one of said quarter sections.

24. The apparatus of claim 23 wherein said exciting means comprises means for exciting said coil to induce said signals in said conductors and wherein said multiplexer means comprises means for selectively switching the other ends of said conductors to said detecting means.

25. The apparatus of claim 24 wherein said multiplexer means is addressable to select the one of said conductors that is switched to said detecting means, and wherein said microprocessor means controls said multiplexer means by transmitting address signals to said multiplexer means.

26. The apparatus of claim 23 wherein said microprocessor means further includes means responsive to the polarity of the signals detected by said detecting means for identifying the one of said quarter sections in which said coil is located, and wherein said polarity changing means changes the polarities of the signals detected by said detecting means in accordance with the directional polarities of said conductor pairs in said identified quarter section.

27. The apparatus of claim 23 wherein each of said quarter sections is of substantially equal width and wherein said exciting means has an effective range approximately equal to said width.

28. The apparatus of claim 23 wherein adjacent conductors in said primary sets are equally spaced from one another.

29. The apparatus of claim 28 wherein said secondary set of conductors are equally spaced between adjacent conductors in said primary sets.

30. The apparatus of claim 23 wherein said multiplexer means includes a plurality of inputs and an output, said primary set of conductors are connected respectively to a predetermined number of said inputs and said secondary set of conductors are connected respectively to the remainder of said inputs.

* * * * *